United States Patent [19]

Le Goff

[11] Patent Number: 4,893,963

[45] Date of Patent: Jan. 16, 1990

[54] SYSTEM FOR COUPLING TWO BODIES, FOR EXAMPLE A CARRIAGE AND A MACHINING STATION

[75] Inventor: Jean-Francois Le Goff, Vitry-sur-Seine, France

[73] Assignee: Aerospatiale Societe Nationale Industrielle, Paris, France

[21] Appl. No.: 239,625

[22] Filed: Sep. 2, 1988

[30] Foreign Application Priority Data

Sep. 11, 1987 [FR] France .................. 8712617[U]

[51] Int. Cl.⁴ ............................................ F16B 21/00
[52] U.S. Cl. ................................. 403/322; 403/377; 414/401; 414/584; 280/477; 104/47
[58] Field of Search ............... 414/400, 401, 584; 104/48, 49, 47, 35; 244/161; 280/492, 494, 477; 403/361, 377, 322

[56] References Cited

U.S. PATENT DOCUMENTS

| | | | |
|---|---|---|---|
| 3,633,813 | 12/1972 | Looney et al. | 228/41 |
| 3,638,983 | 1/1972 | Flournoy et al. | 292/302 |
| 3,709,376 | 1/1973 | Altherr | 280/494 |
| 3,891,237 | 6/1975 | Allen | 280/477 |
| 4,018,409 | 4/1977 | Burch et al. | 244/161 |
| 4,053,973 | 10/1977 | Saipem | 228/44.5 |
| 4,131,295 | 12/1978 | Highberger | 280/477 |
| 4,254,966 | 3/1981 | Mitchell | 280/492 |
| 4,349,211 | 9/1982 | Cooper | 280/492 |
| 4,416,466 | 11/1983 | Park | 280/477 |
| 4,420,169 | 12/1983 | Taylor | 280/494 |

FOREIGN PATENT DOCUMENTS 1577004  8/1969  Fed. Rep. of Germany .

Primary Examiner—Randolph A. Reese
Assistant Examiner—Carol I. Bordas
Attorney, Agent, or Firm—Fisher, Christen & Sabol

[57] ABSTRACT

This invention relates to a system for coupling two bodies able to move relatively with respect to each other by a given incertainty of amplitude, essentially characterized in that it comprises, on a first body, a projecting part having an end section of determined value and members for controlling the displacement of said projecting part with respect to said first body, and, on the second body, a cavity having an inlet opening whose section has dimensions larger than those of the end of the projecting part, the valve of the difference between these two sections being at least equal to that of the given incertainty, and members for exerting at least one couple of reaction forces between said projecting part and the inner wall of said cavity. The invention is more particularly applicable to the systems for coupling carriages and work stations in so-called flexible workshops.

7 Claims, 6 Drawing Sheets

SYSTEM FOR COUPLING TWO BODIES, FOR EXAMPLE A CARRIAGE AND A MACHINING STATION

The present invention relates to systems for coupling two bodies such as, for example, a carriage and a machining station such as those found in places of the "flexible workshop" type.

In order to increase profitability in modern machining techniques, so-called "flexible" workshops have been created which schematically comprise an assembly of machining stations distributed in predetermined manner according to the functions which are to be performed, and at least one carriage which may move in an independent manner, guided by different means, for example optical, magnetic, electrical, etc. . . . , in order to be coupled with the machining stations to furnish them with products or tools necessary for their respective functions. For such a carriage to be able to serve a work station optimally, the coupling system according to the prior art require that it be perfectly positioned with respect to this work station. The design of the means for guiding the carriages is therefore very complex and they are of very high cost. Moreover, these complex guiding means are subject to relatively frequent breakdowns, which contributes to increasing the overall cost of the flexible workshop even further.

It is an object of the present invention to produce a system for coupling two bodies, such as a carriage and a machining station in a workshop of the flexible type, which makes it possible to connect one of the bodies to the other even if the two bodies are not perfectly positioned with respect to each other, which is simple to produce, easy to use and highly reliable, whilst contributing to reducing the cost of the flexible workshop that it equips.

More precisely, the present invention relates to a system for coupling two bodies able to move relatively with respect to each other by a given uncertainty of amplitude, characterized in that it comprises, on the one hand, on a first body, a projecting part having an end section of determined value and means for controlling the displacement of said projecting part with respect to said first body, and, on the other hand, on a second body, a cavity having an inlet opening whose section has dimensions larger than those of said end of the projecting part, the value of the difference between the dimensions of these two sections being at least equal to that of the given uncertainty, and means for exerting at least one couple of reaction forces between said projecting part and the inner wall of said cavity.

The invention will be more readily understood on reading the following description with reference to the accompanying drawings, in which.

Figure 2:
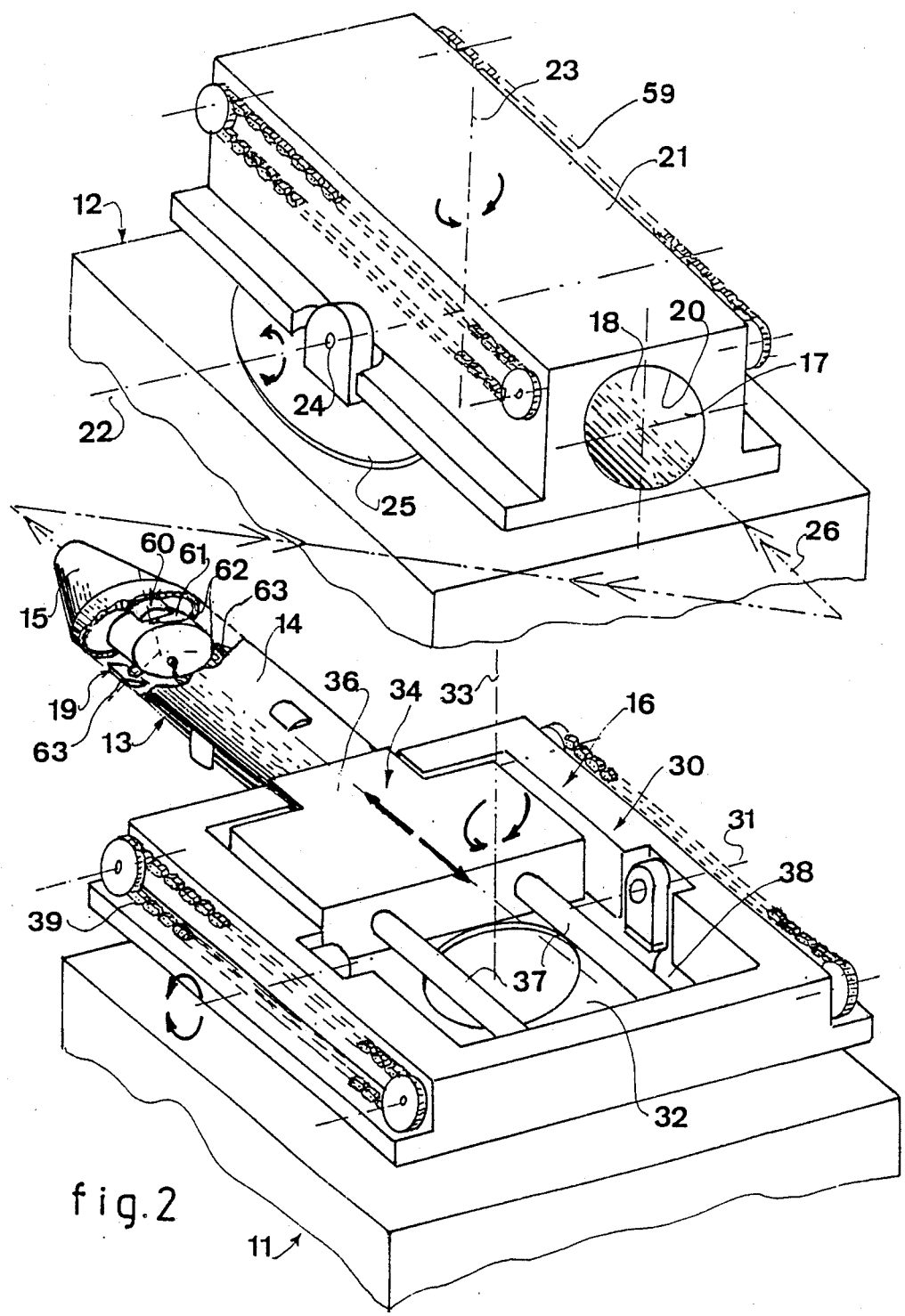
FIG. 2 shows an embodiment of a system for coupling two bodies according to the invention.
Figure 3:
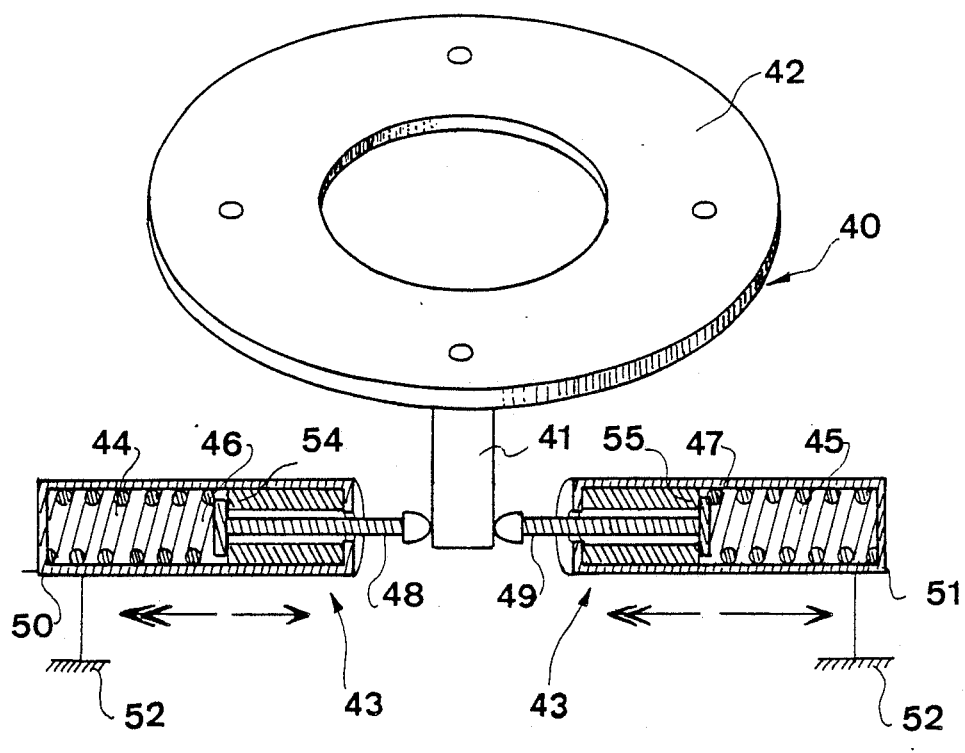

FIG. 3 schematically shows a detail of an improved coupling system of the embodiment of FIG. 2, making it possible to reposition the system in its original position.

Figure 4:
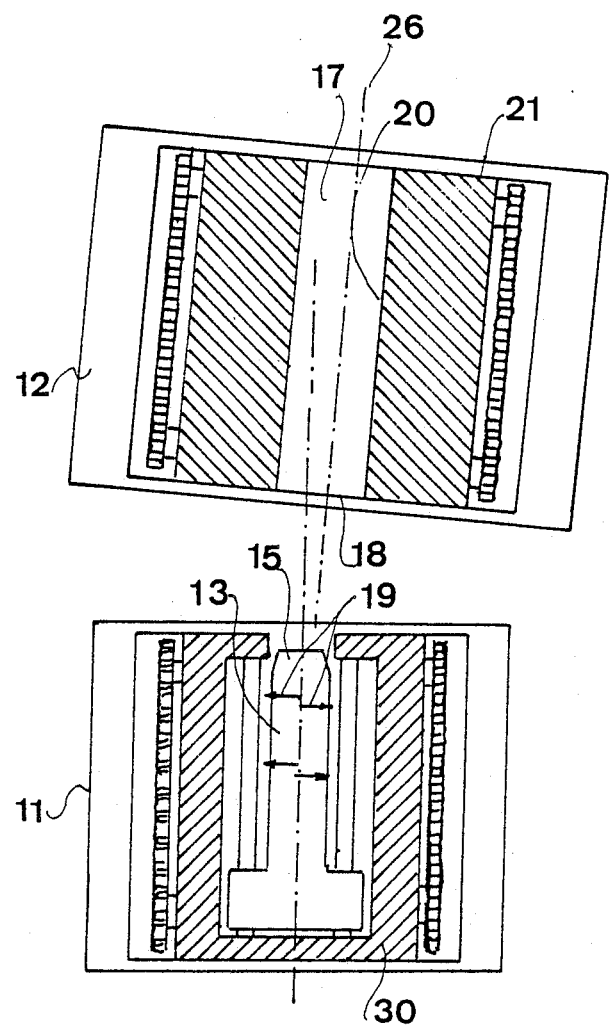
Figure 5:
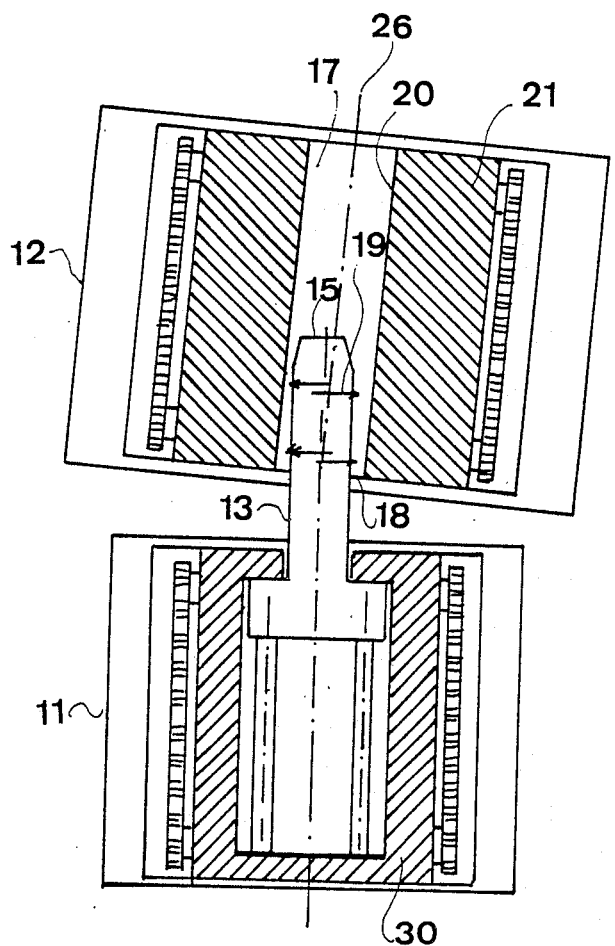
Figure 6:
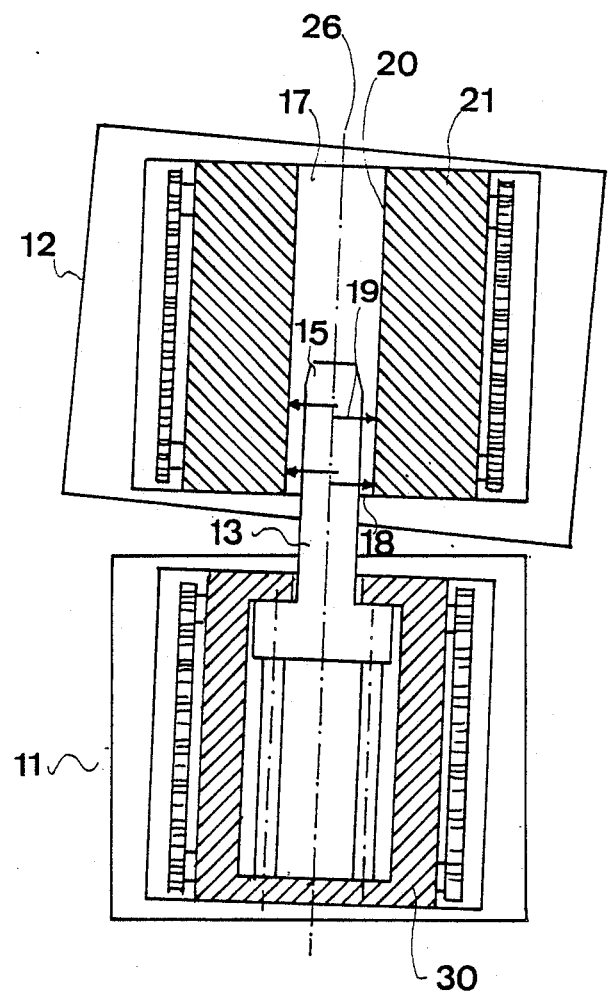

FIGS. 4, 5 and 6 respectively show three diagrams explaining the functioning of a coupling system according to the embodiment illusrated in FIG. 2.

Figure 1:
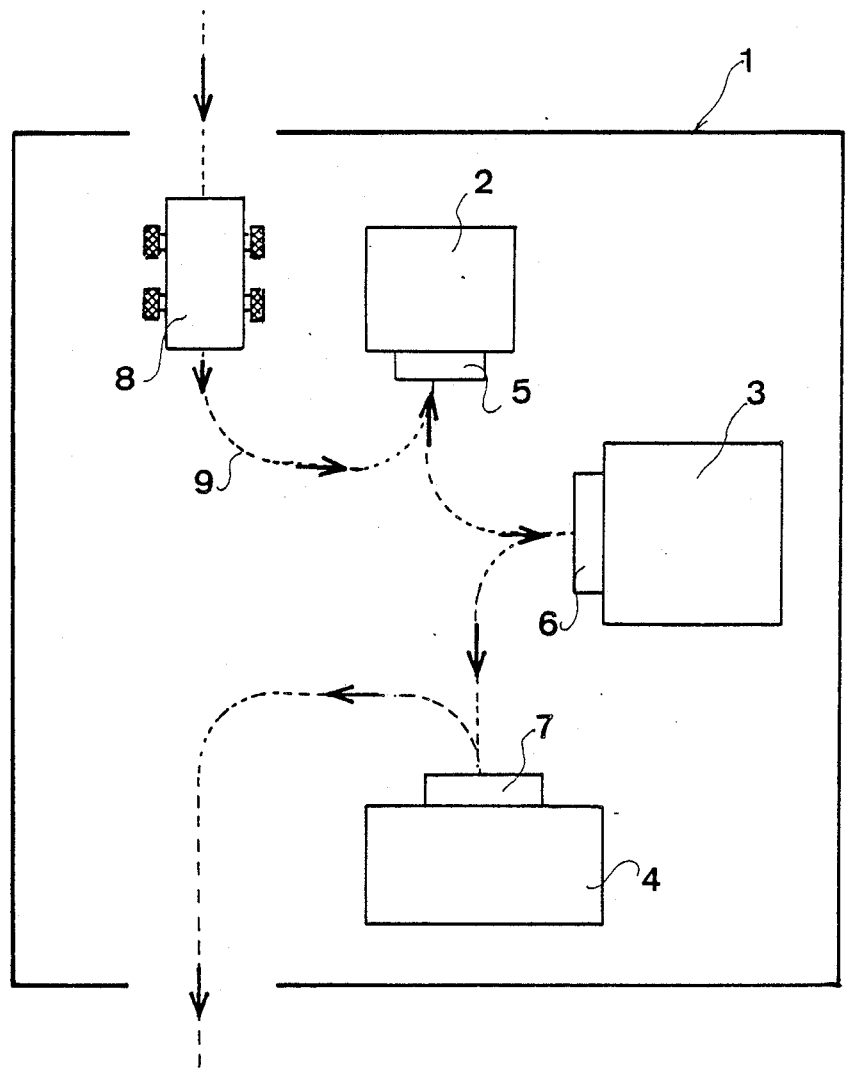
FIG. 1 shows by way of example a schematic diagram of a workshop of the flexible type to which a coupling system according to the invention is advantageously applied.

Referring now to the drawings, FIG. 1 shows, by way of example of application of the coupling system, a flexible workshop 1 comprising, for example, three work stations 2, 3, 4 such as for example machine tools for machining mechanical workpieces such as drilling machines, autolathes, lathes, etc. . . .

These stations respectively comprise an entrance platform 5, 6, 7 via which they may be automatically supplied with workpieces to be treated. In modern workshops, these work stations are supplied by carriages on which the workpieces to be treated are placed. In the example illustrated, only one carriage 8 has been shown. This carriage is automatically guided by means of different sensors, for example of optical, magnetic, mechanical etc. . . . type and programmed to follow a certain path 9. As mentioned hereinabove, with the coupling systems according to the prior art, it is necessary that this programmation allow the carriage to move very precisely with respect to the work station. On the other hand, with the coupling system as illustrated in FIGS. 2 to 6, it is possible to use a carriage guiding device which is much less elaborate.

These Figures illustrate a system for coupling any two bodies 11, 12 which may in fact be the carriage and a work station according to FIG. 1 and may move relatively to each other with a given uncertainty of amplitude.

The first body 11 comprises a projecting part 13 advantageously of oblong shape, such as for example a rod 14 whose end 15 has a section the shape of which decreases progressively, giving it a substantially conical shape. With this projecting part are associated means 16 for controlling its displacement with respect to the first body 11.

The second body 12 comprises a cavity 17 having an entrance opening 18 whose section has a dimension larger than at least that of the end 15 of the projecting part 13, the value of the difference between these two sections being at least equal to that of the uncertainty of the amplitude of the relative movements of the two bodies 11 and 12 mentioned hereinabove, when they must be coupled to each other. In an advantageous embodiment, the smallest inner section over the whole length of the cavity 17 is greater than the largest section over the whole length of the projecting part 13, the value of the difference between these two sections likewise being at least equal to that of the given incertainty defined hereinabove. In this way, the projecting part 13 may penetrate into cavity 17 over a relatively large distance, ensuring a reliable and efficient coupling.

The system further comprises means 19 for exerting at least one couple of reaction forces between the projecting part 13 and the inner wall 20 of the cavity 17. These means may be constituted by jacks 60, for example of the conventional type with rod and cylinder and controlled electrically or hydraulically, the cylinders 61 being fixed to the projecting part 13, preferably embedded in its mass, with the result that only the rods 62 can emerge laterally from this projecting part. The jacks 60 are located in that portion of the projecting part adapted to penetrate in the cavity 17 and the outer ends of the rods are advantageously provided with pads 63 whose shape allows them to retract in the lateral wall of the projecting part 13, when the rods of the jacks are retracted, in order not to hinder the movement of translation of this projecting part which will be mentioned hereinafter, and in order better to fit the shape of the inner wall 20 of the cavity 17. In an advantageous embodiment, the device may comprise three jacks whose rods will be oriented in order to move in directions at one hundred and twenty degrees with respect to one another, as shown in FIG. 2.

The cavity 17 is advantageously made in a head 21 mounted on the second body 12 so that it has at least one degree of freedom of displacement. In the embodiment illustrated, the head 21 is mounted mobile about two axes of rotation 22, 23. It is thus connected to a rotating shaft 24 which allows it to pivot with respect to a frame 25 itself mounted to pivot about axis 23 on the second body 12, these two axes forming therebetween an angle different from a plane angle, and advantageously a right angle, in order to be able to orient the axis 26 of the extrance of the cavity in a solid cone having a vertex angle value as a function of the given incertainty mentioned hereinabove.

As mentioned hereinabove, the axis 26 of the entrance of the cavity may be oriented to accept a solid cone. The same applies to the axis of the projecting part 13, by means 16. These means comprise, in a possible embodiment, a base 30 mounted to pivot about an axis 31 on a plate 32 mounted on the first body 11, itself pivoting about another axis 33, for example and advantageously perpendicular to axis 31.

The coupling system also comprises means 34 for mounting the projecting part 13 in translation with respect to the base 30. An embodiment of these means is illustrated in FIG. 2. They are constituted by a slide 36 mounted on guiding slideways 37, for example rectilinear, located in a housing 38 made in the base 30, the projecting part being mounted fast with the slide 36. Displacement in translation of the slide with respect to the base is obtained, for example, by a drive by any means of which the reciprocating movement is obtained by a motor (not shown in order to simplify the drawing) or by an equivalent means such as a jack.

For correct and repetitive functioning of the coupling system described hereinabove, the latter further comprises means 40 for returning the projecting part 13 and base 30 into an original position relative to first body 11, as well as means for returning the cavity 17 and head 21 into an original position relative to the second body 12 (see, e.g., the relative movement of first body 11/base 30 and second body 12/head 21 in FIGS. 4–6), these positions in fact advantageously being mean positions in the possible volume of displacement as defined hereinbefore of the two bodies 11 and 12 with respect to each other. These means may thus cooperate between, for example, the head 21 and the frame 25, between frame 25 and the second body 12, to return the cavity 17 to an original position, and also between the base 30 and the plate 32, between the plate 32 and the first body 11, in order automatically to return the projecting part 13 to an original position.

FIG. 3 shows a possible embodiment for such means 40. In that case they comprise a catch 41 connected tp a first, 42, of the elements mentioned hereinabove (e.g., frame 25 or plate 32) and means 43 for exerting on this catch 41 two elastic forces of opposite directions, these means being able to be constituted by two springs 44, 45 for traction or thrust, one of their ends 46, 47 being respectively connected by pusher elements 48, 49, to the catch 41, their other two ends 50, 51 being respectively connected to the other second element 52 with respect to which the first element 42 must be repositioned (e.g., second body 12 or first body 11 respectively).

In this way, when an effort is exerted on one of the two elements 42 or 52, teh catch transmits it via one of the pusher elements 48, 49 to one of the two springs 44, 45 which is compressed and which thus increases its reaction force in order to attempt to compensate that of the effort, whilst the other spring exerts no action. When the effort on the element is cancelled, the spring no longer being subjected to a counter-force, it slackens and attempts to return the pusher element to its stop position against an inner stop 54, 55. As the end of the pusher elements acts on the catch 41, the latter is returned to its predetermined original position, as well as the element 42 with which it is associated which may then participate in a new coupling. Since the means 40 for returning the constituent parts of the invention to a starting position (e.g. frame 25/second body 12 and plate 30/first body 11) shown in FIG. 3 utilizes pusher elements 48 and 49 which are only capable of linear movement, this particular means 40 would only be useful in applications wherein the relative movement (e.g., between the frame 25/second body 12 and plate 30/first body 11) would be significantly less than 360°. If a greater scope of movement were desired, different means 40 for returning the constituent parts of the invention to a starting position relative to each other would be employed.

The system described hereinabove operates as follows, this description being explained more particularly with regard to FIGS. 4 to 6. It is firstly specified that the first body 11, for example a carriage, may come into position, with a certain uncertainty in its placing, opposite the second body 12, for example a work station, this uncertainty being defined, for example, by the value of the maximum distance that may separate two points belonging respectively to the two bodies 11, 12, without the relative position of these two points being known with precision.

FIG. 4 shows the two bodies 11, 12 approximately opposite each other, positioned, however, so that the projecting part 13 is contained in the projection of the entrance section 18 of the cavity 17. This condition is ia consequence of the respective values of the sections defined hereinabove. It is specified that the two elements, in the present case the projecting part 13 and the cavity 17, are disposed in their originial position with respect to their repsective bodies, thanks to the means 40 for returning into original position, described hereinabove.

When the two bodies are in the position as shown in FIG. 4, the projecting part 13 is controlled in translation on slideways 37 so that the conical end 15 penetrates into cavity 17, this being possible since the section of this end is smaller than that of the entrance 18 of the cavity 17. When this projecting part has penetrated into the cavity, its end abuts against the inner wall 20 of the cavity and the reaction force between these two elements obliges the two elements to be oriented with respect to each other, all the better as they have structures as described with reference to FIG. 2, knowing that this reaction occurs in opposition to that given by the means 40 for returning to an original position.

Furthermore, it is also possible that this projecting part penetrates directly into the cavity without coming into contact with its inner wall 20, as more precisely illustrated in FIG. 5. In one or the other case, when the projecting part has sufficiently entered the cavity, the jacks 19 are extended so that their heads are applied against the inner wall 20 of the cavity. By the simple effect of the couple of opposite forces, on the one hand the axes of the projecting part and of the cavity are perfectly aligned and, on the other hand, the two elements are connected (FIG. 6).

Since the head 21 and the base 30 are in alignment, the workpieces to be treated which are on the first body 11 may automatically pass onto the head 21 of the second body 12, providing for the example of use given hereinbefore. To that end, the base 30 and the head 21 may comprise drive chains 39 and 59 respectively, which may be coupled to supporting tables on which the workpieces to be treated or the machined pieces may be disposed.

When such an operation is finished, the jacks 19 are retracted, the projecting part is returned into the housing 38 and the different elements are returned into the parts original position thanks to the means 40 for returning into original position. The two elements 13 and 21 are then ready to start such a coupling operation again, for the same two bodies or for another carriage with the same work station, or for the same carriage with another station, knowing that coupling means all identical to that described hereinabove may equip all the bodies of the same workshop.

Such a coupling device does not present any major difficulty in use and it makes it possible to compensate the uncertainties of positioning the two bodies. Carriages provided with low-performance driving means may therefore be used, thus contributing to reducing the cost of the installation of a flexible workshop still further.

What is claimed is:

1. A system for coupling two bodies able to move relatively with respect to each other, comprising:
   a head mounted on a first body of said two bodies and able to rotate about a first axis with respect to said first body, said body having a cavity therein and being biased by a first biasing spring means urging said cavity to a first reference position;
   a base mounted on the second body of said two bodies and able to rotate about a first axis with respect to said second body, said base having an extendable projecting part able to penetrate into said cavity of said head and said base being biased by second biasing spring means urging said projecting part to a second reference position; and
   said extendable projecting part having transverse expandable means able to contact the inner wall of said cavity.

2. The system of claim 1, wherein:
   said first biasing means comprises two opposite springs fixed on said first body and pressing between them a catch fixed on said head; and
   said second biasing means comprises two opposite springs fixed on said other body and pressing between them a catch fixed on said base.

3. A system for coupling two bodies able to move relatively with respect to each other, comprising:
   a frame mounted on one body of said two bodies and able to rotate about a first axis with respect to said one body, a head mounted on said frame and able to rotate about a second axis with respect to said body, said head having a cavity and being biased by first and second spring biasing means to a reference position, said first spring biasing means being disposed between said one body and said frame and said second spring biasing means being disposed between said frame and said head;
   a plate mounted on the second of said two bodies and able to rotate about a first axis with respect to said second body, a base mounted on said plate and able to rotate about a second axis with respect to said body, said base having an extendable projecting part able to penetrate into said cavity and being biased by first and second spring biasing means being disposed between said second body and said plate, and said second spring biasing means being disposed between said plate and said base;
   said extendable projecting part having transverse expandable means able to contact the inner wall of said cavity.

4. The system of claim 3, wherein:
   said first head spring biasing means comprises two opposite springs fixed on said one body and pressing between them a catch fixed on said frame;
   said second head spring biasing means comprises two opposite springs fixed on said second body and pressing between them a catch fixed on said plate;
   said first base spring biasing means comprises two opposite springs fixed on said frame and pressing between them a catch fixed on said head; and
   said second base spring biasing means comprises two opposite springs fixed on said plate and pressing between them a catch fixed on said base.

5. The system of claim 3, wherein said projecting part is mounted slidable on slideways fixed to said base.

6. The system of claim 3, wherein said head and said base have drive means for transferring work pieces from one of the bodies to the other.

7. The system of claim 3 wherein said transverse expandable means comprise jacks.

* * * * *